(12) United States Patent
Yamada

(10) Patent No.: US 6,224,168 B1
(45) Date of Patent: May 1, 2001

(54) FLUID PRESSURE GENERATING SYSTEM FOR A VEHICLE AND BRAKE FLUID PRESSURE CONTROL SYSTEM FOR A VEHICLE

(75) Inventor: Satoshi Yamada, Anjo (JP)

(73) Assignee: Aisin Seiki Kabushiki Kaisha, Kariya (JP)

(*) Notice: Subject to any disclaimer, the term of this patent is extended or adjusted under 35 U.S.C. 154(b) by 0 days.

(21) Appl. No.: 09/265,382

(22) Filed: Mar. 10, 1999

(30) Foreign Application Priority Data

Mar. 10, 1998 (JP) .................................................. 10-057878

(51) Int. Cl.[7] .................................................. B60T 13/74
(52) U.S. Cl. .................................................. 303/3; 303/10
(58) Field of Search ........................... 303/3, 10, 122.11, 303/122.12, 122.13, 122.14, 122.03, 122.09, 122.1, 122.08, 122.05, DIG. 4, 113.3

(56) References Cited

U.S. PATENT DOCUMENTS

| | | | |
|---|---|---|---|
| 4,586,591 | * 5/1986 | Belart | 303/122.14 X |
| 5,054,860 | * 10/1991 | Nomura et al. | 303/122.1 X |
| 5,221,125 | * 6/1993 | Okochi et al. | 303/10 |
| 5,779,327 | * 7/1998 | Nakashima et al. | 303/122.12 |
| 5,934,880 | * 8/1999 | Yamada et al. | 303/10 X |

FOREIGN PATENT DOCUMENTS

| | | |
|---|---|---|
| 3833473 | 4/1990 | (DE) . |
| 2226284 | 6/1990 | (GB) . |

OTHER PUBLICATIONS

Toyota Aristo Instruction Manual dated Aug., 1997, pp. 2-60 thru 2-62.

* cited by examiner

Primary Examiner—Robert J. Oberleitner
Assistant Examiner—Melanie Talavera
(74) Attorney, Agent, or Firm—Burns, Doane, Swecker & Mathis, LLP

(57) ABSTRACT

A fluid pressure generating system for a vehicle has a reservoir that stores brake fluid, a fluid pump that pressurizes the brake fluid, an accumulator that accumulates brake fluid pressurized by the fluid pump, and a pressure switch that detects a pressure value in the accumulator. A warning device is adapted to be operated in response to the pressure switch, and a mechanism is provided for detecting a stop of the vehicle. A warning suspending device controls the warning device by using a signal from the pressure switch and a signal from the device for detecting a stop of said vehicle.

14 Claims, 4 Drawing Sheets

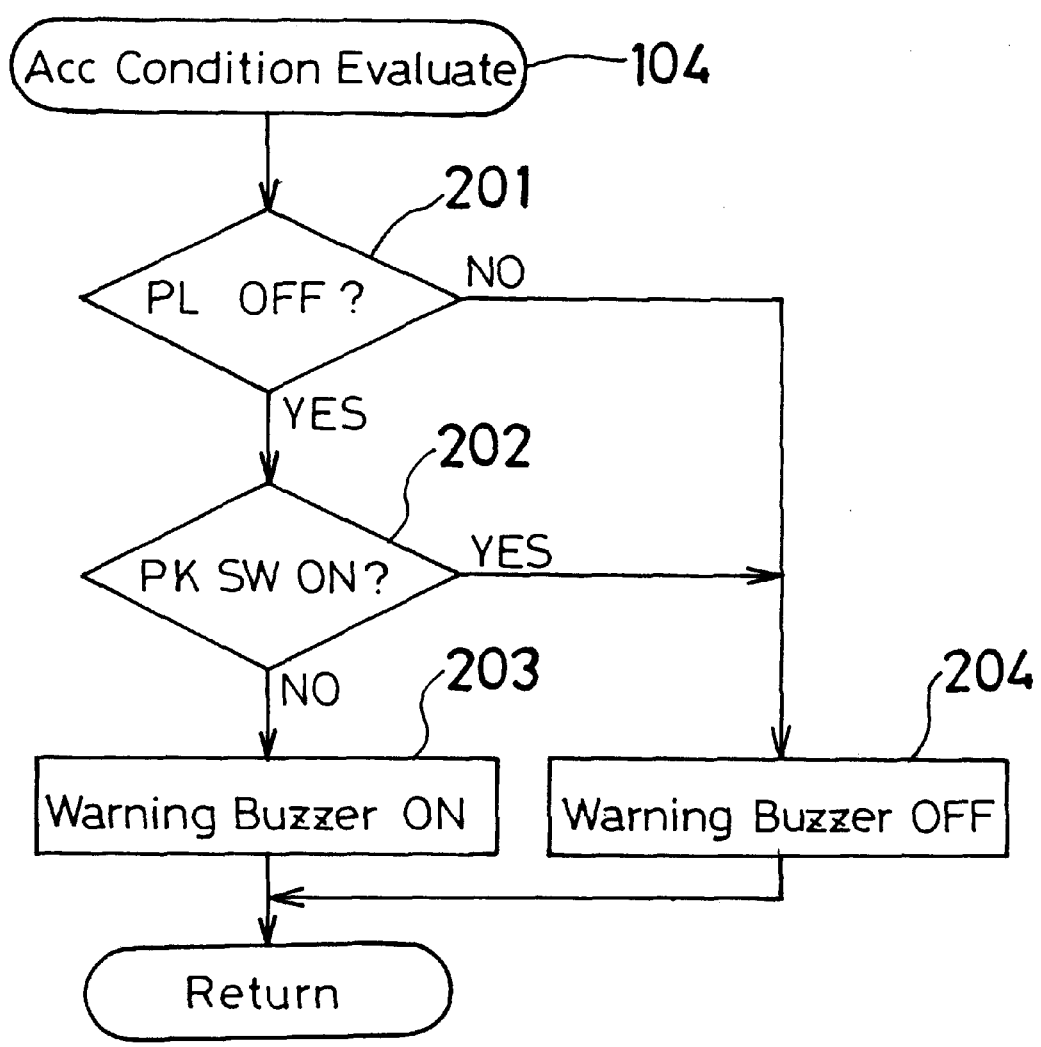

FLUID PRESSURE GENERATING SYSTEM FOR A VEHICLE AND BRAKE FLUID PRESSURE CONTROL SYSTEM FOR A VEHICLE

FIELD OF THE INVENTION

The present invention generally relates to a vehicle braking system. More particularly, the present invention pertains to a fluid pressure generating system for a vehicle which can be applied to, for example, a vehicle brake fluid pressure control system.

BACKGROUND OF THE INVENTION

A known type of fluid pressure generating system is disclosed in a new model instruction manual issued on Aug. 27, 1997 for the Toyota Aristo. As described in this instruction manual, the fluid pressure generating system is applied to a brake fluid pressure control system which is adapted to perform anti-slip control, brake assist control, and anti-skidding control.

The fluid pressure generating system includes a fluid reservoir that is adapted to store brake fluid, a fluid pump for generating fluid pressure, and an accumulator for storing pressurized fluid. The accumulator is provided with first and second pressure switches for detecting a pressure value in the fluid circuit. The first pressure switch also controls the operation of the fluid pump. When the first pressure switch detects that the fluid pressure changing value in the accumulator is less than a first predetermined pressure level, the first pressure switch generates a low pressure signal (turn off signal) for the control unit. On the other hand, when the first pressure switch detects that the fluid pressure changing value in the accumulator is more than a second predetermined pressure level which is higher than the first predetermined pressure level, the first pressure switch generates a high pressure signal (turn on signal) for the control unit. When the low pressure signal is generated, the fluid pump is driven and when the high pressure signal is generated, the operation of the fluid pump is suspended after a predetermined period of time.

When the second pressure switch detects that the fluid pressure changing value in the accumulator is less than a third predetermined pressure level which is lower than the first predetermined pressure level, the second pressure switch generates a low pressure signal (turn off signal) to the control unit. On the other hand, when the second pressure switch detects that the fluid pressure changing value in the accumulator is more than a fourth predetermined pressure level which is higher than the third predetermined pressure level, the second pressure switch generates a high pressure signal (turn on signal) to the control unit. When the second pressure switch generates the low pressure signal, the controller determines a disabled condition of the accumulator and turns on a warning lamp and outputs a buzzer using a warning buzzer to alert the operator.

However, this known fluid pressure generating system suffers from certain disadvantages and drawbacks. If the vehicle maintains a parked condition for a long period of time, the stored brake fluid in the accumulator may be leaked. If the leakage from the accumulator is to be eliminated, the accumulator should be designed to ensure an accurate fluid-tight structure. However, it has been found to be rather costly to ensure an accurate fluid-tight manner in the brake fluid circuit. In this known fluid circuit structure, when the engine is turned on after a long term parking condition, the fluid pressure value in the accumulator indicates that the pressure is below the third predetermined pressure level.

In the known system, when the second pressure switch generates a low pressure signal (in another words, when the fluid pressure value in the accumulator is indicated to be below the third predetermined pressure level), the system determines the disabled condition of the accumulator and starts operating the warning system under the non disabled condition of the accumulator. This misoperation especially occurs after long term parking and gives the operator an unpleasant feeling.

In light of the foregoing, a need exists for an improved hydraulic pressure generating system that is not as susceptible to the same disadvantages and drawbacks as the system described above.

It would thus be desirable to provide a hydraulic pressure generating system that is not as susceptible to misoperation such as after long term parking of the vehicle.

SUMMARY OF THE INVENTION

According to one aspect of the invention, A fluid pressure generating system for a vehicle includes a reservoir for storing fluid, a fluid pump for pressurizing fluid stored in the reservoir, an accumulator for accumulating fluid pressurized by said fluid pump, a pressure switch for detecting a pressure value in said accumulator, a warning device that is operational in response to the pressure switch, a mechanism for detecting a stop of the vehicle, and warning suspending arrangement for suspending operation of the warning device based on a signal from the pressure switch and a signal from the detecting mechanism.

According to another aspect of the invention, a brake fluid pressure control system for a vehicle includes a reservoir for storing brake fluid, a master cylinder for generating a master cylinder pressure in response to operation of the brake pedal, a first wheel cylinder for generating a brake force to be applied to a wheel, and a second wheel cylinder for generating a brake force to be applied to another wheel. A fluid pump is connected to the reservoir for pressurizing brake fluid in the reservoir, and an accumulator accumulates brake fluid pressurized by the fluid pump. A fluid booster generates a regulator pressure using the accumulator pressure and based on the master cylinder pressure while a pressure switch detects the pressure in the accumulator. A warning device is provided that is operable in response to the pressure switch, and a mechanism is provided for determining a stopped condition of the vehicle. A warning suspending arrangement is adapted to suspend operation of the warning device based on the signal from the pressure switch and the signal from the detecting mechanism.

BRIEF DESCRIPTION OF THE DRAWING FIGURES

Additional features and characteristics of the present invention will become more apparent from the following detailed description considered with reference to the accompanying drawing figures in which like elements are designated by like reference numerals and wherein:

FIG 5 is an accumulator disable condition detecting flow chart which is processed in accordance with the present invention.

DETAILED DESCRIPTION OF THE PREFERRED EMBODIMENT

Figure 1:
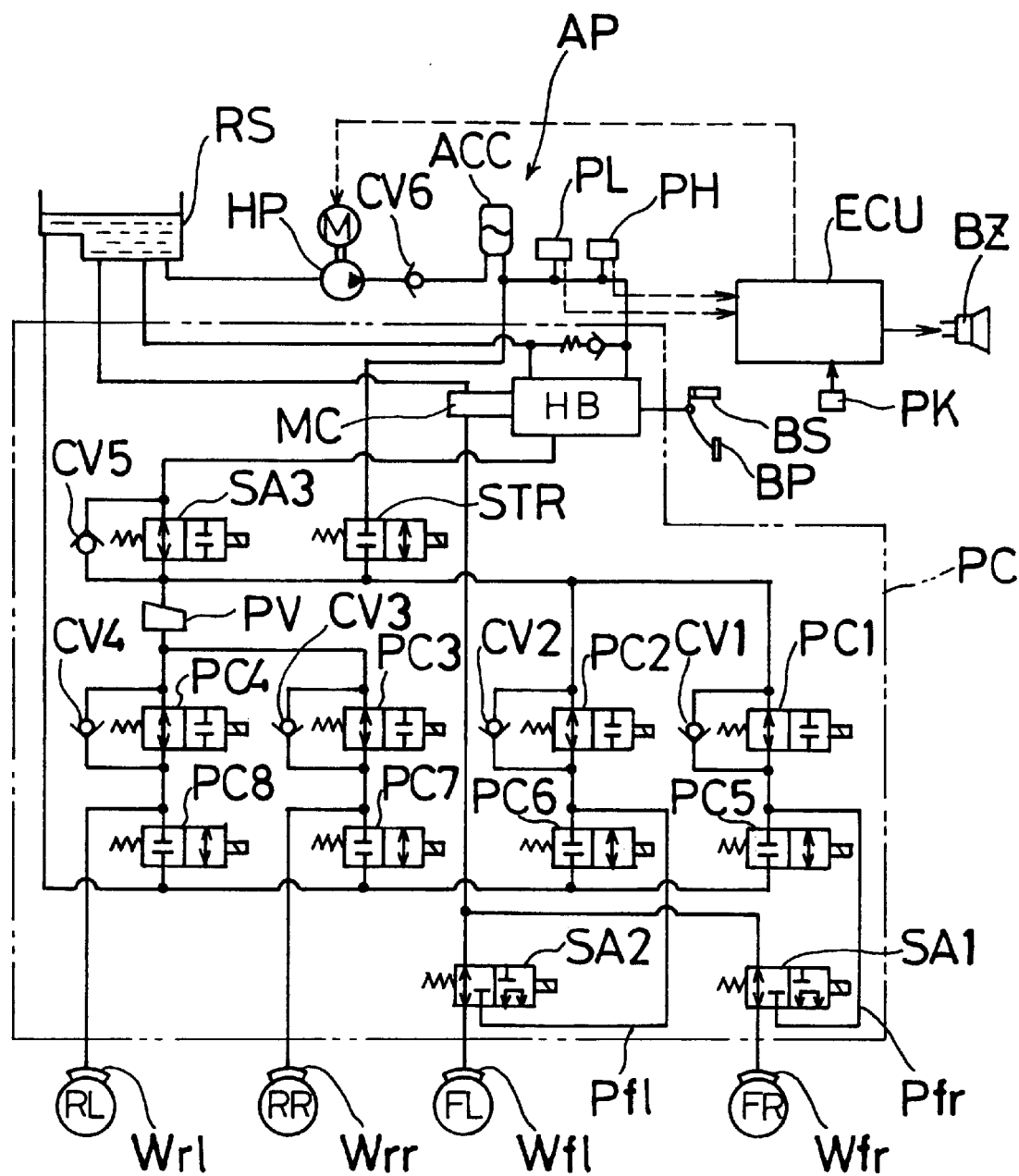
FIG. 1 is a schematic illustration of the brake fluid pressure control circuit according to the present invention.

Referring initially to FIG. 1, a brake fluid control circuit PC is provided with a fluid pressure generator AP according to the present invention. The brake fluid control circuit PC includes a master cylinder MC and a fluid booster HB that are driven in response to the depression of a brake pedal BP. The fluid pressure generator AP is connected to the fluid booster HB so that high pressurized power fluid is introduced to the fluid booster HB. The fluid booster HB functions as a regulator to regulate the output fluid pressure of the fluid pressure generator AP for producing regulated pressure with regard to the output fluid pressure of the master cylinder MC. In this arrangement, the master cylinder MC is boosted by the fluid booster HB.

The brake fluid control circuit PC includes a front wheel side fluid circuit and a rear wheel side fluid circuit. A solenoid valve SA1 is arranged between the wheel cylinder Wfr and the master cylinder MC in the front wheel side fluid circuit. Another solenoid valve SA2 is arranged between the wheel cylinder WfL and the master cylinder MC in the front wheel side fluid circuit. The solenoid valve SA1 is connected to a pair of solenoid valves PC1, PC5 by way of a fluid path Pfr, while the solenoid valve SA2 is connected to a pair of solenoid valves PC2, PC6 by way of a fluid path PfL.

A proportioning valve PV and a plurality of solenoid valves P3, P4, P7, P8 are arranged in the rear wheel pressure control circuit. A solenoid SA3 and the various solenoid valves PC1–PC8 are arranged between the fluid booster HB and the wheel cylinders WrL, Wrr, WtL, Wfr. The output of the fluid pressure generator AP is arranged downstream from the solenoid valve SA3 by way of a solenoid valve STR. The brake fluid control circuit shown in FIG. 1 is adapted to control the front and rear wheel cylinders independently. However, it is to be understood that other fluid circuits (e.g. an X shaped fluid circuit) could be equally used in connection with the present invention.

In the front wheel pressure control circuit, the solenoid valves PC1, PC2 are connected to the solenoid valve STR and the solenoid valve SA3. The solenoid valve STR is in the form of a 2-port, 2-position solenoid valve. Under the deenergized condition, the solenoid valve STR interrupts fluid communication between the fluid pressure generator AP and the solenoid valve SA3. When the solenoid valve STR is energized, the solenoid valves PC1, PC2 are adapted to be communicated with an accumulator Acc, which is arranged in the fluid pressure generator AP. The solenoid valves SA1, SA2 are in the form of 3-port, 2-position solenoid valves. When the solenoid valves SA1, SA2 are in the deenergized condition as shown FIG. 1, the wheel cylinders Wfr, WfL, are in communication with the master cylinder MC. When the solenoid valves SA1, SA2 are energized, the wheel cylinders Wfr, WfL, communicate with the solenoid valves PC1, PC5 and PC2, PC6, respectively instead of with the master cylinder MC.

A one-way valve CV1 is connected between the inlet port and the outlet port of the solenoid valve PC1, and a one-way valve CV2 is connected between the inlet port and the outlet port of the solenoid valve PC2. The one-way valve CV1 permits fluid flow from the fluid path Pfr to the solenoid valve STR and the solenoid valve SA3. Similarly, the one-way valve CV2 permits the fluid flow from the fluid path Pfl to solenoid valve STR and the solenoid valve SA3. When the solenoid valve SA1 is energized and the brake pedal BP is released, the oneway valve CV1 permits fluid flow from the fluid path Pfr to the solenoid valve STR and thus releases or reduces the fluid pressure in the wheel cylinder Wfr. The one-way valve CV2 functions in a manner similar to the one-way valve CV1 in that when the solenoid valve SA2 is energized and the brake pedal BP is released, the one-way valve CV2 permits fluid flow from the fluid path PfL to the solenoid valve STR and thus releases or reduces the fluid pressure in the wheel cylinder WfL.

In the rear wheel pressure control circuit, the solenoid valve SA3 is in the form of a 2-port, 2-position solenoid valve. Under the deenergized condition of the solenoid valve SA3, the solenoid valves PC3, PC4 communicate with the fluid booster HB by way of the proportioning valve PV. Under this condition, the solenoid valve STR is controlled to be in the deenergized condition, and the proportioning valve PV is prevented from communicating with the accumulator Acc. When the solenoid valve SA3 is energized, the communication between the solenoid valves PC3, PC4 and the fluid booster HB is interrupted, and the solenoid valves PC3, PC4 communicate with the solenoid valve STR by way of the proportioning valve PV. In this condition, when the solenoid valve STR is energized, the solenoid valves PC3, PC4 communicate with the accumulator Acc.

A one-way valve CV3, CV4 is connected between the inlet port and the outlet port of the solenoid valve PC3, and a one-way valve CV4 is connected between the inlet port and the outlet port of the solenoid valve PC4. The one-way valve CV3 permits fluid flow from the wheel cylinder Wrr to the proportioning valve PV. Further, the one way valve CV4 permits fluid flow from the wheel cylinder WrL to the proportioning valve PV. When the brake pedal BP is released, the one-way valves CV3, CV4 permit fluid flow from the wheel cylinders Wrr, WrL. According to this operation, the fluid pressure in the wheel cylinders Wrr, WrL follow the operation of the fluid booster HB.

A one-way valve CV5 is connected between the inlet port and the outlet port of the solenoid valve SA3. The one-way valve CV5 permits fluid flow from the fluid booster HB to the proportioning valve PV. When the solenoid valve SA3 is deenergized, fluid flow from the fluid booster HB to a point downstream of the solenoid valve SA3 is permitted by way of the one-way valve CV5.

Each of the solenoid valves SA1, SA2, SA3, STR and PC1–PC8 is driven and operated by a controller. Under the control of the controller, an anti-skid control, an over steer control, an under steer control, a traction control, and a brake assist control are adapted to be performed. If the anti-skid control is being performed when the brake pedal BP is not operated, the fluid booster HB and the master cylinder MC are not generating a brake control fluid pressure. In this condition, the solenoid valves SA1, SA2, SA3, STR are energized. The wheel cylinders Wfr, WfL, Wrr, WrL thus communicate with the fluid pressure generator AP by way of the solenoid valve STR and the solenoid valves PC1, PC2, PC3, PC4. The fluid pressure in each of the wheel cylinders Wfr, WfL, Wrr, WrL is controlled in response to the operation of the solenoid valves PC1–PC8, and a steep pressure gain operation, a slow pressure gain operation, a slow pressure loss operation, a steep pressure loss operation and a pressure maintaining operation in the each of the wheel cylinders is established.

The fluid pressure generator AP includes a reservoir RS, a fluid pump HP, a motor M, and the accumulator Acc. The fluid pump HP is connected to the reservoir RE to draw in fluid from the reservoir RS and discharge pressurized fluid to the accumulator Acc. The fluid pump HP is driven by the motor M. The accumulator Acc is connected to the fluid pump HP, and accumulates the discharged high pressurized fluid from the fluid pump HP. A one-way valve CV6 is disposed between the accumulator Acc and the fluid pump HP. This one-way valve CV6 permits fluid flow from the fluid pump HP to the accumulator Acc.

Figure 2:
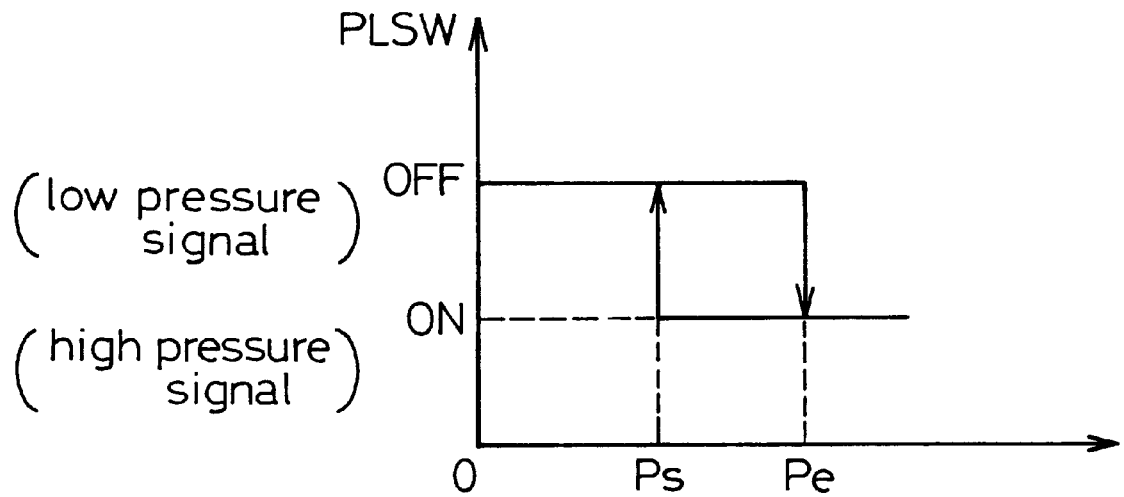
FIG. 2 is a graph illustrating the operation of the pressure switch PH used in the brake fluid pressure control circuit shown in FIG. 1.
Figure 3:
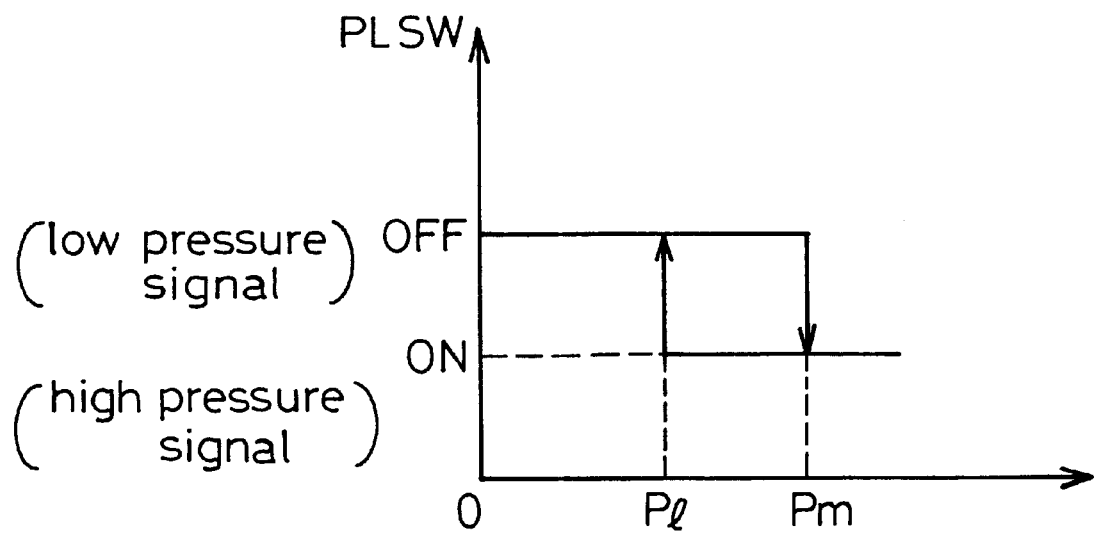
FIG. 3 is a graph illustrating the operation of the pressure switch PL used in the brake fluid pressure control circuit shown in FIG. 1.

A pair of pressure switches PH, PL which are adapted to sense fluid pressure are connected in series to the accumulator Acc. Output from the pressure switch PH is used to control the motor M by sensing the fluid pressure in the fluid pressure generator AP, while the pressure switch PL detects a low fluid pressure in the fluid pressure generator AP. As shown in FIG. 2, when the pressure switch PH detects that the fluid pressure changing value (actual pressure value) in the accumulator Acc is less than a first predetermined pressure level Ps, the pressure switch PH generates a low pressure signal (a turn off signal) to an electric control unit ECU. On the other hand, when the pressure switch PH detects that the fluid pressure changing value in the accumulator Acc is more than a second predetermined pressure level Pe, the pressure switch PH generates a high pressure signal (a turn on signal) to the electric control unit ECU. As shown in FIG. 3, when the pressure switch PL detects that the fluid pressure changing value in the accumulator Acc is less than a third predetermined pressure level Pl, the pressure switch PL generates a low pressure signal (a turn off signal) to the electric control unit ECU. On the other hand, when the pressure switch PL detects that the fluid pressure changing value in the accumulator Acc is more than a fourth predetermined pressure level Pm, the pressure switch PL generates a high pressure signal (a turn on signal) to the electric control unit ECU. The third predetermined pressure level Pl is set up as the lowest pressure level.

A parking brake operating switch PK which detects the operating condition of a parking brake is arranged at or operatively associated with a parking brake operating lever. When the parking brake is operated, the parking brake operating switch PK generates an ON signal to the electric control unit ECU. When the parking brake is not operated, the parking brake operating switch PK generates an OFF signal to the electric control unit ECU. The motor M is operated by the electric control unit ECU based on the output signal from the pressure switch PH, and a warning buzzer BZ which is connected to the electric control unit ECU is operated based on the output signal from the pressure switch PL. The operation of the electric control unit ECU will be explained with reference to FIG. 4 and FIG. 5.

Figure 4:
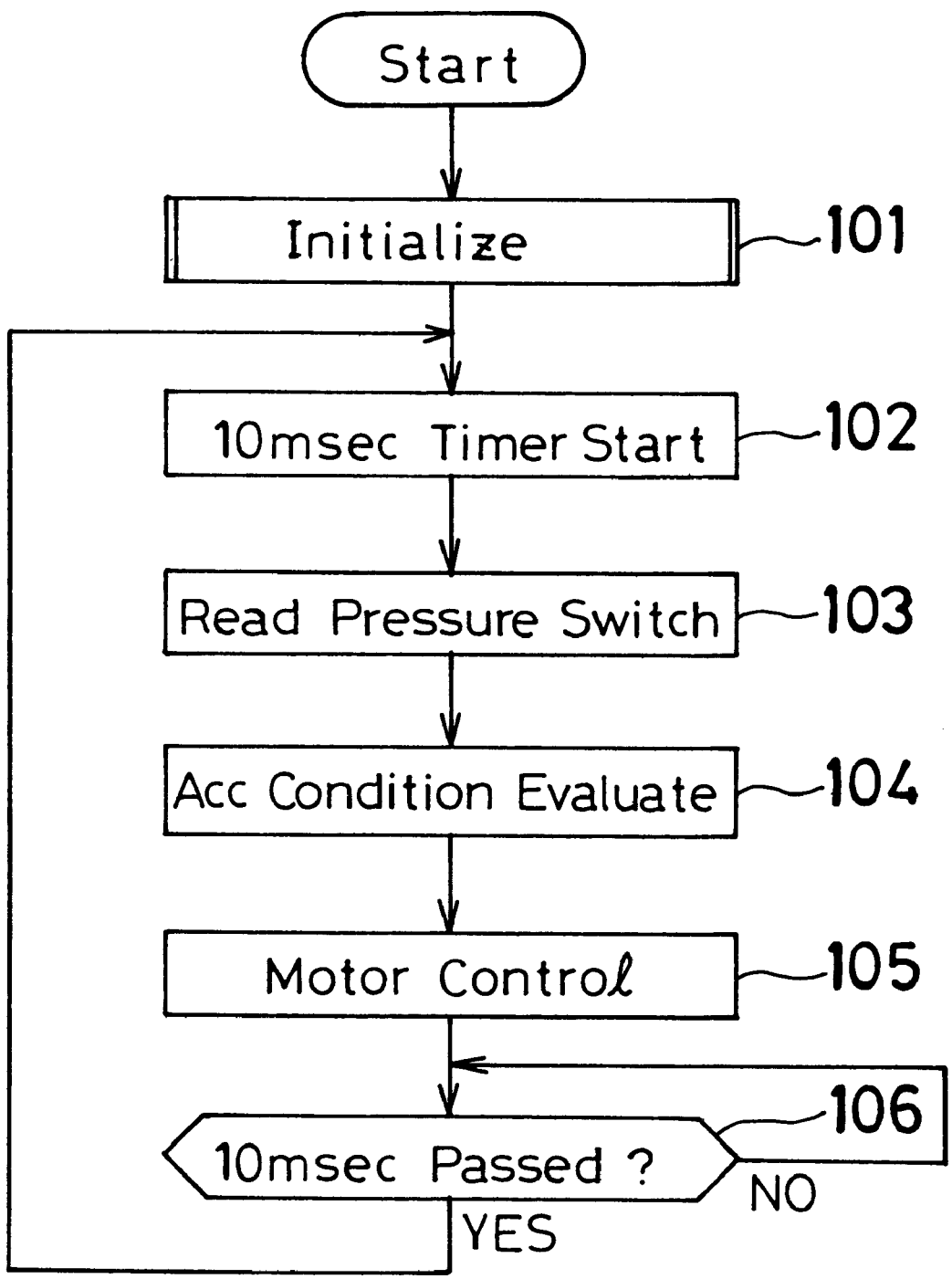
FIG. 4 is a main flow chart illustrating operation of the system of the present invention.

When the vehicle ignition switch is turned on, a program is initialized at step 101 in FIG. 4 and then proceeds to step 102. At step 102, a timer having a ten (10) millisecond interval is started. At step 103, signals from the pressure switches PH, PL and the parking brake operating switch PK are read and stored in the program. At step 104, the condition of the accumulator Acc is evaluated. The accumulator Acc evaluation is described below in more detail with reference to the routine shown in FIG. 5.

After execution of step 104, the program proceeds to step 105 and the motor M is controlled. When the output signal from the pressure switch PH changes from the high pressure signal to the low pressure signal, the motor M is turned on. When the output signal from the pressure switch PH changes from the low pressure signal to the high pressure signal and a predetermined time has passed, the motor M is turned off. When the pressure switch PH is disabled, the pressure value in the accumulator Acc changes to a level below the third predetermined pressure level Pl and then the output signal from the pressure switch PL changes from the high pressure signal to the low pressure signal. In this condition, the motor M is driven and the back-up operating condition is generated. Under this condition, when the output signal of the pressure switch PL changes from the low pressure signal to the high pressure signal, the motor M is turned off. At step 106, the timer determines whether or not 10 (ten) milliseconds have passed. If 10 (ten) milliseconds have passed, the program returns to step 102. If 10 (ten) milliseconds have not passed, the program repeats step 106 until 10 milliseconds have elapsed.

The evaluation process for the accumulator Acc will be explained with reference to FIG. 5. At step 201, the condition of the pressure switch PL is detected. If a low pressure signal (a turned off signal) is generated by the pressure switch PL, the program proceeds to step 202. If a high pressure signal (a turned on signal) is generated by the pressure switch PL, the program proceeds to step 204 and then the warning buzzer BZ is turned off and the program returns to the main routine. At step 202, the condition of the parking brake operating switch PK is detected. If the parking brake operating switch PK is turned off (in other words, the driver intends to drive the vehicle), the program proceeds to step 203 and the accumulator Acc is determined to be in a disabled condition. At step 203, the warning buzzer BZ is turned on and the program then returns to the main routine which is shown in FIG. 4. If the parking brake operating switch PK is turned on (in another words, the driver does not intend to drive the vehicle), the program proceeds to step 204 and the accumulator Acc is determined to be in a normal condition. At step 204, the warning buzzer BZ is turned off and the program returns to the main routine shown in FIG. 4.

In this embodiment, when the pressure switch PL generates a low pressure signal and the parking brake operating switch PK generates an ON signal, the program prohibits the operation of the warning buzzer BZ. If the operator has not driven the vehicle embodied with the present invention for a relatively long period of time, and the operator then turns on the ignition, under the condition in which the pressure switch is generating a low pressure signal, the warning buzzer BZ is not operated. Accordingly, the accurate operating condition of the accumulator Acc will be established and misoperation of the warning buzzer will be decreased.

In this embodiment, the vehicle operating condition or stopped condition is detected by using the parking brake operating switch. However, it is to be understood that the vehicle operating condition could be detected by using, for example, the automatic transmission shift lever.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims be embraced thereby.

What is claimed is:

1. A fluid pressure generating system for a vehicle comprising;
    a reservoir for storing a fluid;
    a fluid pump for pressurizing fluid stored in the reservoir;
    an accumulator for accumulating fluid pressurized by said fluid pump;
    a pressure switch for detecting a pressure value in said accumulator;
    a warning means that is operational in response to said pressure switch;
    means for detecting a stop of the vehicle; and
    warning suspending means for suspending operation of the warning means based on a signal from said pressure switch and a signal from said means for detecting a stop of said vehicle.

2. A fluid pressure generating system for a vehicle as set forth in claim 1, wherein said means for detecting a stop of said vehicle detects a parking brake operating condition and said warning suspending means suspends operation of said warning means based on operation of said pressure switch and the parking brake operating condition.

3. A fluid pressure generating system for a vehicle as set forth in claim 1, wherein said pressure switch generates a low pressure signal when an actual pressure value in said accumulator is less than a first predetermined pressure level and said pressure switch generates a high pressure signal when said actual pressure value in said accumulator is more than a second predetermined pressure level.

4. A fluid pressure generating system for a vehicle as set forth in claim 1, wherein said pressure switch is a first pressure switch, and including a second pressure switch and fluid pump control means for controlling said fluid pump in response to a signal generated by said second pressure switch.

5. A fluid pressure generating system for a vehicle as set forth in claim 4, wherein said fluid pump control means operates said fluid pump when said second pressure switch generates a low pressure signal and said fluid pump control means suspends operation of said fluid pump when said second pressure switch generates a high pressure signal.

6. A brake fluid pressure control system for a vehicle comprising;
    a reservoir for storing a brake fluid;
    a master cylinder for generating a master cylinder pressure in response to operation of a brake pedal;
    a first wheel cylinder for applying a brake force to a first wheel;
    a fluid pump connected to the reservoir for pressurizing brake fluid in the reservoir;
    an accumulator for accumulating brake fluid pressurized by said fluid pump;
    a fluid booster for generating a regulator pressure using said accumulator pressure based on said master cylinder pressure;
    a second wheel cylinder for applying a brake force to a second wheel;
    a pressure switch for detecting a pressure value in said accumulator;
    warning means operable in response to said pressure switch;
    means for detecting a stop of said vehicle; and
    warning suspending means for suspending operation of said warning means based on a signal from said pressure switch and a signal from said means for detecting a stop of said vehicle.

7. A fluid pressure generating system for a vehicle as set forth in claim 6, wherein said means for detecting a stop of said vehicle detects an operational state of a parking brake and said warning suspending means determines whether to suspend operation of said warning means based on the operational state of the parking brake as detected by said means for detecting a stop of the vehicle.

8. A fluid pressure generating system for a vehicle as set forth in claim 6, wherein said pressure switch generates a low pressure signal when a pressure value in said accumulator is less than a first predetermined pressure level and said pressure switch generates a high pressure signal when said pressure value in said accumulator is more than a second predetermined pressure level.

9. A fluid pressure generating system for a vehicle as set forth in claim 6, wherein said pressure switch is a first pressure switch, and including a second pressure switch for determining the pressure value in the accumulator and fluid pump control means for controlling operation of said fluid pump in response to the pressure value determined by said second pressure switch.

10. A fluid pressure generating system for a vehicle as set forth in claim 9, wherein said fluid pump control means operates said fluid pump when said second pressure switch generates said low pressure signal and said fluid pump control means suspends operation of said fluid pump when said second pressure switch generates said high pressure signal.

11. A fluid pressure generating system for a vehicle comprising:
    a reservoir for storing fluid;
    a fluid pump connected to the reservoir for pumping fluid in the reservoir;
    an accumulator connected to the pump for accumulating fluid pressurized by said fluid pump;
    a pressure switch which outputs a signal in response to a pressure in said accumulator;
    warning means adapted to be operated in response to the signal outputted by said pressure switch;
    means for detecting an operational state of the vehicle; and
    means for suspending operation of said warning means based on the signal from said pressure switch and a signal from said means for detecting an operational state of the vehicle;
    said means for detecting an operational state of the vehicle being adapted to detect an operational state of a parking brake of the vehicle, said means for suspending operation of said warning means determining whether to suspend operation of said warning means based on the operational state of the parking brake.

12. A fluid pressure generating system for a vehicle as set forth in claim 11, wherein said pressure switch generates a low pressure signal when a pressure value in said accumulator is less than a first predetermined pressure level and said pressure switch generates a high pressure signal when said pressure value in said accumulator is more than a second predetermined pressure level.

13. A fluid pressure generating system for a vehicle as set forth in claim 11, wherein said pressure switch is a first pressure switch, and including a second pressure switch for determining the pressure value in the accumulator and fluid pump control means for controlling operation of said fluid pump in response to the pressure determined by said second pressure switch.

14. A fluid pressure generating system for a vehicle as set forth in claim 13, wherein said fluid pump control means operates said fluid pump when said second pressure switch generates said low pressure signal and said fluid pump control means suspends operation of said fluid pump when said second pressure switch generates said high pressure signal.

* * * * *